(12) United States Patent
Zhang et al.

(10) Patent No.: US 11,134,704 B2
(45) Date of Patent: Oct. 5, 2021

(54) LIQUEFACTION DEVICE OF HARD BONE AND METHOD FOR CO-PRODUCTION OF BONE COLLAGEN POLYPEPTIDE AND ULTRAFINE BONE POWDER

(71) Applicant: Institute of Food Science and Technology, Chinese Academy of Agricultural Sciences, Beijing (CN)

(72) Inventors: Chunhui Zhang, Beijing (CN); Wei Jia, Beijing (CN); Xia Li, Beijing (CN); Hongru Zhang, Beijing (CN); Xiaojie Qin, Beijing (CN)

(73) Assignee: Institute of Food Science and Technology, Chinese Academy of Agricultural Sciences, Beijing (CN)

( * ) Notice: Subject to any disclaimer, the term of this patent is extended or adjusted under 35 U.S.C. 154(b) by 450 days.

(21) Appl. No.: 16/170,845

(22) Filed: Oct. 25, 2018

(65) Prior Publication Data
US 2020/0022383 A1    Jan. 23, 2020

(30) Foreign Application Priority Data

Jul. 19, 2018 (CN) .......................... 201810796528.2

(51) Int. Cl.
*A23J 1/10* (2006.01)
*A23J 3/04* (2006.01)
(Continued)

(52) U.S. Cl.
CPC . *A23J 1/10* (2013.01); *A23J 3/04* (2013.01); *A23L 5/13* (2016.08); *A23L 5/21* (2016.08);
(Continued)

(58) Field of Classification Search
CPC .. A47J 36/20; A47J 36/22; A47J 27/08; A47J 27/0817; A47J 27/13; B01D 21/009;
(Continued)

(56) References Cited

U.S. PATENT DOCUMENTS 1,958,590 A * 5/1934 Royden .................. F24C 7/008
219/401
2,539,226 A * 1/1951 Bierman .................. A23B 7/06
99/470
(Continued)

FOREIGN PATENT DOCUMENTS

CN           101385545 A  *  3/2009

*Primary Examiner* — T. Bennett McKenzie
(74) *Attorney, Agent, or Firm* — CBM Patent Consulting, LLC

(57) ABSTRACT

The invention discloses a liquefaction device of hard bone, comprising: outer cavity having upper end detachably sealed with upper cover, and lower end openable/closable sealed with lower sealing cover, first liquefaction cavity coaxially slidably disposed in outer cavity, stainless steel cage disposed coaxially in first liquefaction cavity, second liquefaction cavity fixed to outer sidewall of outer cavity such that lower end portion of outer cavity is located in second liquefaction cavity. The invention also provides a method for co-production of bone collagen polypeptide and ultrafine bone powder based on liquefaction device, including: selecting hard bones, crushing; performing first-stage and second-stage liquefaction to obtain liquid phase and solid phase; centrifuging, concentrating, drying liquid phase to obtain bone collagen polypeptide; drying, coarsely and superfine pulverizing solid phase to obtain ultrafine bone powder. The invention has effects of simplifying process, improving production efficiency, and reducing production and equipment investments.

10 Claims, 4 Drawing Sheets

(51) Int. Cl.
    *B01D 39/08*      (2006.01)
    *B01D 39/10*      (2006.01)
    *B01D 45/08*      (2006.01)
    *B02C 17/08*      (2006.01)
    *B09B 3/00*      (2006.01)
    *A23L 5/10*      (2016.01)
    *A23L 5/20*      (2016.01)
    *F22B 37/26*      (2006.01)
    *B01J 3/00*      (2006.01)
    *B01J 3/02*      (2006.01)
    *B01J 3/03*      (2006.01)

(58) Field of Classification Search
    CPC ........ B01D 39/08; B01D 39/10; B01D 45/08;
        A23L 5/13; A23L 5/21; A23J 1/002; A23J
        3/04–12; B01J 3/00–08; B02C 17/08;
        B09B 3/0091; F22B 37/26–327
    USPC ........... 422/295–304; 99/470, 471, 477–479;
        435/273; 426/657
    See application file for complete search history.

(56) References Cited

U.S. PATENT DOCUMENTS

| | | | | |
|---|---|---|---|---|
| 3,187,664 A * | 6/1965 | Jennings | ............. | A47J 27/0802 99/329 R |
| 3,592,668 A * | 7/1971 | Denk | ....................... | A47J 27/16 99/324 |
| 3,655,411 A * | 4/1972 | Albright | ............. | A47J 27/0817 99/330 |
| 3,682,091 A * | 8/1972 | Bredeson | ................ | A47J 27/14 99/348 |
| 3,744,402 A * | 7/1973 | Piegza | ..................... | A23L 3/14 99/360 |
| 3,782,267 A * | 1/1974 | Moore | ................ | A47J 27/0817 99/410 |
| 3,871,334 A * | 3/1975 | Axelrod | ................ | A01K 15/026 119/710 |
| 3,949,659 A * | 4/1976 | Hunt | ....................... | A47J 27/14 99/348 |
| 3,951,131 A * | 4/1976 | Houfek | .................... | A47J 27/16 126/369 |
| 4,238,996 A * | 12/1980 | Okuyama | ................ | A47J 27/04 126/369 |
| 5,301,604 A * | 4/1994 | Takahashi | ........... | A47J 27/0817 99/330 |
| 2003/0170364 A1* | 9/2003 | Broderick | .............. | A23N 7/005 426/481 |
| 2006/0254976 A1* | 11/2006 | Cooper | ................. | A47J 43/285 210/470 |
| 2012/0245402 A1* | 9/2012 | Ross | ..................... | B09B 3/0075 588/317 |
| 2014/0083306 A1* | 3/2014 | Lee | ......................... | A47J 27/08 99/413 |
| 2020/0205432 A1* | 7/2020 | Zhang | ..................... | A23C 9/18 |

\* cited by examiner

LIQUEFACTION DEVICE OF HARD BONE AND METHOD FOR CO-PRODUCTION OF BONE COLLAGEN POLYPEPTIDE AND ULTRAFINE BONE POWDER

This application claims priority to Chinese Patent Application Ser. No. CN2018107965282 filed 19 Jul. 2018

TECHNICAL FIELD

The present invention relates to a liquefaction device and a method for co-production polypeptide and bone powder. More specifically, the present invention relates to a liquefaction device of hard bone and method for co-production of bone collagen polypeptide and ultrafine bone powder, and belongs to the fields of food processing.

BACKGROUND

Animal bones have unique structure that is "hard as cast iron and light as wood" due to the unique physiological role of supporting and protecting the body. Animal bones are rich in proteins and minerals. Among the proteins that make up them, 40% to 45% are structurally dense three-helical collagen. In minerals of the body, 99% of total calcium and 85% of total phosphorus are present in the bones, and in the hard structure of hydroxyapatite. The research results show that calcium in the bones can not be extracted by the general cooking and stewing, and the calcium can be freed by calcination at a temperature of above 600 degree Celsius. Therefore, the unique physiological function of the bones causes its hard structure, which makes outstanding problem of low extraction efficiency.

Hot-pressing extraction is the use of high-temperature and high-pressure methods to accelerate the maturity of food and extract the components that are difficult to extract in food. The common household pressure cooker is a small hot-pressing extraction device. The hot-pressing extraction can effectively extract proteins, minerals, polysaccharides and other substances in bone for pig bones, beef bones and other cooking with higher cooking conditions relative to chicken bones. The hydrolysis degree of the extract reaches about 10%, and the nutrient content is rich in high temperature and high pressure. It is the main extraction method of bone substances from livestock and poultry in the enterprise.

The acid hydrolysis method is the main way to prepare calcium and phosphorus preparations from bone as raw material under the action of acid. The essence is to use the action of acid to destroy the salt and ester bonds of collagen protein in bone mud or bone powder, so as to denature the protein and thereby expose the hydroxyapatite. The hydroxyapatite is organically combined with the collagen fiber, which is beneficial to the dissolution of calcium, and then the acid reacts with the hydroxyapatite to convert the bone calcium into soluble calcium.

The alkaline hydrolysis method is to soak the bone residue with sodium hydroxide, and then obtain the product by high pressure cooking, drying and pulverizing. Although the amount of calcium and phosphorus in the product is increased respectively, the protein in the bone is largely lost after treatment, and the main components of produced active calcium are calcium hydroxide and calcium oxide, which have high activity and are easy to be combined with other substances in the intestine such as oxalic acid, phytic acid to produce precipitates, which are not conducive to human body absorption. Although the alkaline hydrolysis method can reduce the particle size of the bone product, it will seriously damage the main nutrient protein in the bone and reduce the nutritional value of the bone.

The enzyme is added to the bones of the livestock and poultry. The collagen fibers in the bones can be decomposed into water-soluble animal protein gelatin by the action of the enzyme; and calcium phosphate deposited on the collagen fibers, that is, the hydroxyapatite structure is also destroyed, so the calcium ions are freed. The residual proteins in the bone product are decomposed by one or more suitable enzymes. The bone collagen difficult to use by short time heating is hydrolyzed into polypeptides and amino acids, which can greatly improve the nutritional value and functional properties of the bones.

However, the above methods all have the problems of complicated process, long time-consuming, high production cost, and large equipment investment. The most commonly used hot-press extraction method in the industry requires a large amount of solvent to be added during cooking, finally needs to be concentrated, dried and removed, and consumes a lot of water and energy. How to simplify the process flow, improve production efficiency, and reduce production cost and equipment investment is an urgent problem in the field of bone processing.

DESCRIPTION

A purpose of the present invention is to provide a liquefaction device of hard bone, which can perform first-stage liquefaction and second-stage liquefaction on a hard bone, and can also perform solid-liquid separation on the liquefied product, thereby simplifying process flow of hard bone and increasing production efficiency.

Another purpose of the present invention is to provide a method for co-production of bone collagen polypeptide and ultrafine bone powder, which can simplify process flow of hard bone, and improve the efficiency of co-production of bone collagen polypeptide and ultrafine bone powder, while reducing production costs and equipment investment.

In view of purposes mentioned above and other advantages, the present invention provides a liquefaction device of hard bone, comprising:

an outer cavity, the upper end of which is detachably sealed with an upper cover, and the lower end is openable/closable sealed with a lower sealing cover, and the upper cover having a feeding port and a first steam inlet port;

a first liquefaction cavity, which is coaxially and slidably up and down disposed in the outer cavity, and a sidewall of the first liquefaction cavity being provided with a pressure relief port;

a stainless steel cage disposed coaxially in the first liquefaction cavity, and a top surface of the stainless steel cage being detachably connected to a bottom surface of the upper cover, and the top surface of the stainless steel cage being located below the feeding port and having a feeding inlet;

a second liquefaction cavity having a top surface fixed to an outer sidewall of the outer cavity such that a lower end portion of the outer cavity is located in the second liquefaction cavity.

Preferably, the horizontal spacing between the stainless steel cage and the first liquefaction cavity is 3 to 5 cm, and a plurality of through circular hole with a hole diameter of 1 to 2 cm being uniformly formed on the side wall and the bottom surface of the stainless steel cage, the volume of the two liquefaction cavity being 10 to 50 times that of the first liquefaction cavity.

Preferably, a second steam inlet port is opened on the top surface of the second liquefaction cavity, a discharge port is opened on the bottom surface of the second liquefaction cavity, a steam outlet port is opened on the sidewall of the second liquefaction cavity, and the steam outlet port is covered with an openable/closable steam outlet cover.

Preferably, the feeding port is coaxially disposed with the outer cavity, and the feeding port is openable/closable provided with a sealing cover, the center of the top surface of the sealing cover being fixed with a lifting lug, and the lower sealing cover being elliptical shape bulged upward, a vacuum tube being fixed to a sidewall of the second liquefaction cavity, and the vacuum tube being in communication with the second liquefaction cavity;

also comprising:

a pair of first cylinder brackets horizontally and symmetrically fixed on the outer side wall of the outer cavity;

a pair of first open cover cylinders respectively correspondingly fixed to a pair of first cylinder brackets, piston rods of a pair of first open cover cylinders extending into the second liquefaction cavity and each of the lower end portion horizontally fixing with a crossbeam, and the crossbeam being fixed to the lower sealing cover by two vertical supporting rods;

a pair of second cylinder brackets vertically and symmetrically fixed on the upper and lower sides of the steam outlet port;

a pair of second open cover cylinders respectively correspondingly fixed to a pair of second cylinder brackets, a vertical beam being fixedly connected between piston rods of the pair of second open cover cylinders, and the vertical beam being fixed to the steam outlet cover by two horizontal supporting rods;

wherein the piston rods of the pair of first open cover cylinders are shortened such that the lower sealing cover abuts against the lower end portion of the outer cavity and the first liquefaction cavity, and the piston rods of the pair of first open cover cylinders extending such that the lower sealing cover separates from the lower end portion of the outer cavity, the piston rods of the pair of second open cover cylinders shortening to close the steam outlet cover, and the piston rods of the pair of second open cover cylinders extending to open the steam outlet cover.

Preferably, a pair of sliders are symmetrically disposed on the outer sidewall of the first liquefaction cavity, and a pair of sliding rails adapted to the pair of sliders are arranged on the inner wall of the outer cavity so that the first liquefaction cavity slides up and down relative to the outer cavity, a sealing member being fixed on the bottom surface of the upper cover, and the upper end portion of the first liquefaction cavity and the sealing member tightly abutting against when the piston rods of the pair of first open cover cylinders are shortened to seal a gap between the upper end portion of the first liquefaction cavity and the upper end portion of the outer cavity.

Preferably, the liquefaction device of hard bone also comprises:

a steam-liquid separation device provided in the second liquefaction cavity, the steam-liquid separation device comprising a separation pipe, a steam outlet pipe and a liquid collecting pipe, the separation pipe being a horizontal square pipe, the separation pipe being opening far from one end of the steam outlet port, the bottom surface of the separation pipe being uniformly provided with a plurality of liquid outlets, and the separation pipe being provided with a plurality of V-shaped liquid separation plates with an angle of 60 degrees, and the plurality of liquid separation plates including a plurality of upper liquid separation plates and a plurality of lower liquid separation plates with equal number, one end of the plurality of upper liquid separation plates being fixed on the top surface of the separation pipe at a 1-shape equal interval along the length direction of the separation pipe, and one end of the plurality of lower liquid separation plates being fixed on the bottom surface of the separation pipe at a 1-shape equal interval along the length direction of the separation pipe, and a lower liquid separation plate being arranged between the two adjacent upper liquid separation plates, previous upper liquid separation plate and the apex of the adjacent next lower liquid separation plate being located in the same vertical line along the direction of fluid flow, and each liquid separation plate being provided with a plurality of run-through circular holes, the diameter of a plurality of circular holes on a plurality of upper liquid separation plates and the diameter of a plurality of circular holes on a plurality of lower liquid separation plates increasing sequentially along the direction of fluid flow, the steam outlet pipe comprising an inclined pipe section inclined upward at 45 degrees, a straight pipe section communicated with the inclined pipe section and horizontally arranged, and the lower end of the inclined pipe section being communicated with one end of the separation pipe close to the steam outlet port, the straight pipe section being communicated with the steam outlet port, the liquid collecting pipe being a vertical funnel shape, the upper end of the liquid collecting pipe being communicated with the bottom of the separation pipe, and the bottom of the liquid collecting pipe being slightly higher than the bottom of the second liquefaction cavity;

a solid-liquid separation device comprising a filter tube communicating with the discharge port, and a liquid pumping pump communicated to the filter tube, the filter tube being a vertically disposed circular tube, the upper end surface of the filter tube being provided a liquid inlet and the lower end surface being provided with a liquid outlet, the liquid inlet being communicated to the discharge port, and the liquid outlet being communicated with the liquid pumping pump, and multi-layer stainless steel mesh and a filter cloth with a 200-gauge diameter being fixed at equal intervals from the top to the bottom of the filter tube.

The purpose of the present invention can also be further achieved by a method for co-production of bone collagen polypeptide and ultrafine bone powder based on the liquefaction device of hard bone, the method including the steps of:

step one: selecting hard bones of the edible animal and crushing;

step two: feeding the crushed hard bone of the step one into the stainless steel cage, closing the lower sealing cover to seal the outer cavity, and introducing saturated steam with a pressure of 1.5 to 2.3 MPa into the first steam inlet port, performing first-stage liquefaction, the first-stage liquefaction time being 10-20 min, and the pressure of the second liquefaction cavity being drawn to a negative pressure of −0.08--0.09 MPa, and then opening the lower sealing cover for the first pressure relief, after completing the first pressure relief, introducing saturated steam with a pressure of 1.0-2.0 MPa into the second steam inlet port, performing second-stage liquefaction, and the second-stage liquefaction time being 5-10 min, and finally performing the second pressure relief to obtain liquid phase and solid phase;

step three: centrifuging, concentrating and drying the liquid phase obtained in the step two to obtain the bone collagen polypeptide;

step four: drying, performing coarsely pulverizing and superfine pulverizing the solid phase prepared in the step two to obtain ultrafine bone powder.

Preferably, the particle size of the hard bone after crushing in step one is 3-5 cm.

Preferably, the specific operation of the step three includes: centrifuging the liquid phase at a rotational speed of 14000-16000 rpm to obtain a bone collagen polypeptide solution, and then concentrating the bone collagen polypeptide solution to a concentration of 40-55 degrees Brix to obtain a concentrated solution, finally, performing spray-drying of the concentrated solution at 140-180 degree Celsius to obtain the bone collagen polypeptide.

Preferably, the specific operation of step four includes: drying the solid phase at a temperature of 60-80 degree Celsius to a water content of 5 to 8%, and then placing the dried solid phase in a high-speed universal pulverizer for coarse pulverization to obtain ultrafine bone powder with a particle size of 100-250 micrometer, finally, placing the ultrafine bone powder in a planetary ball mill, and milling 3-4 h at a speed of 350-450 r/min and a milling ball diameter of 1-2 cm to obtain the ultrafine bone powder with a particle size of less than 15 micrometer.

The present invention at least comprises the following beneficial effects:

1. The liquefaction device of hard bone provided by the present invention can perform first-stage liquefaction and second-stage liquefaction on a hard bone, can fully liquefy soluble components in the hard bone, and greatly improve the treatment effect of the hard bone. The stainless steel cage can realize solid-liquid separation, and the solid-liquid separation of the product is completed at the same time of liquefaction, thereby greatly improving the processing efficiency of the hard bone, simplifying the process flow, and reducing the production cost.

2. In the liquefaction device of the hard bone provided by the present invention, the steam-liquid separation device can effectively intercept the liquid product brought out by the steam during the pressure relief in the second-stage liquefaction, thereby improving the yield of the product. The solid-liquid separation device can effectively remove fine bone chips mixed in the liquid product to facilitate the subsequent treatment of the liquid product, wherein the separation pipe in the steam-liquid separation device is provided with a plurality of V-shaped liquid separation plates, and the liquid separation plates are arranged at intervals on the top surface and the bottom surface of the separation pipe. The structure can increase separation area of steam and liquid, thereby effectively intercepting the liquid product brought out in the steam, and at the same time it will not significantly prolong the time of pressure relief. Thus, the effect of second-stage liquefaction will not be reduced while ensuring steam-liquid separation.

3. In the method for co-production of bone collagen polypeptide and ultrafine bone powder provided by the present invention, the physical liquefaction method is used for processing the hard bone, without using s a large amount of raw materials such as solvent, acid and alkali and enzyme, thereby prepared product with higher safety. Moreover, the use of low-grade steam can achieve that hard bones are difficult to process by conventional methods, greatly improving production efficiency and product quality, while reducing production costs.

4. The liquefaction device of hard bone provided by the present invention has low cost and low investment, and the method for co-production of bone collagen polypeptide and ultrafine bone powder is simple and easy to operate, having high production efficiency, capable of realizing co-production of different products, having low residual soluble components in the bone powder, which is conducive to large-scale production.

Other advantages, objects, and features of the present invention will be showed in part through following description, and in part will be understood by those skilled in the art from study and practice of the present invention.

DETAILED DESCRIPTION

The present invention will now be described in further detail with reference to the accompanying drawings and embodiments in order to enable person skilled in the art to practice with reference to the description.

It should be noted that in the description of the present invention, the terms of "having", "comprising" and "including" do not match the existence or addition of one or more other elements or their combinations.

Figure 1:
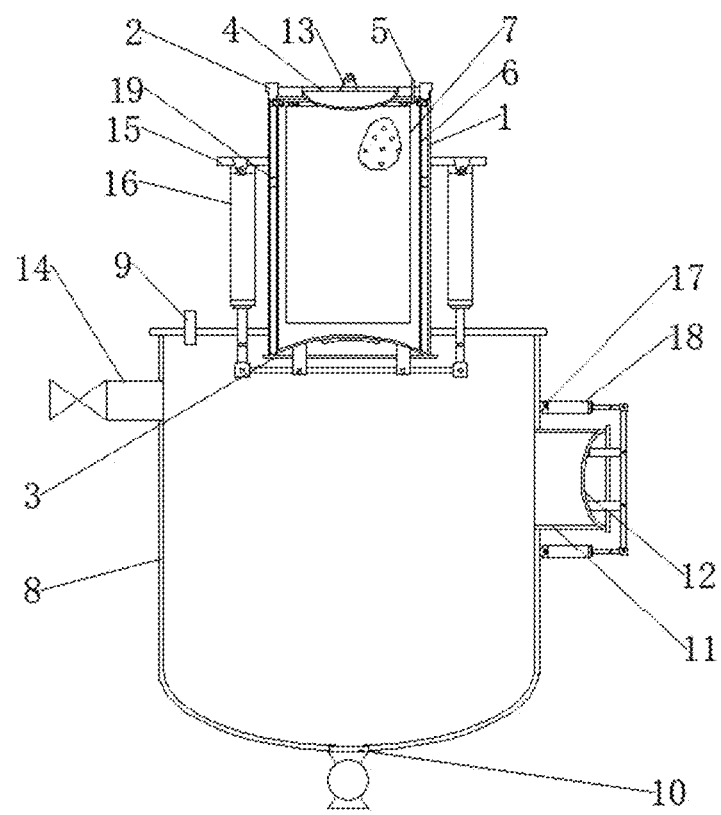
FIG. 1 is a structural view of the liquefaction device of hard bone of a technical solution.
Figure 2:
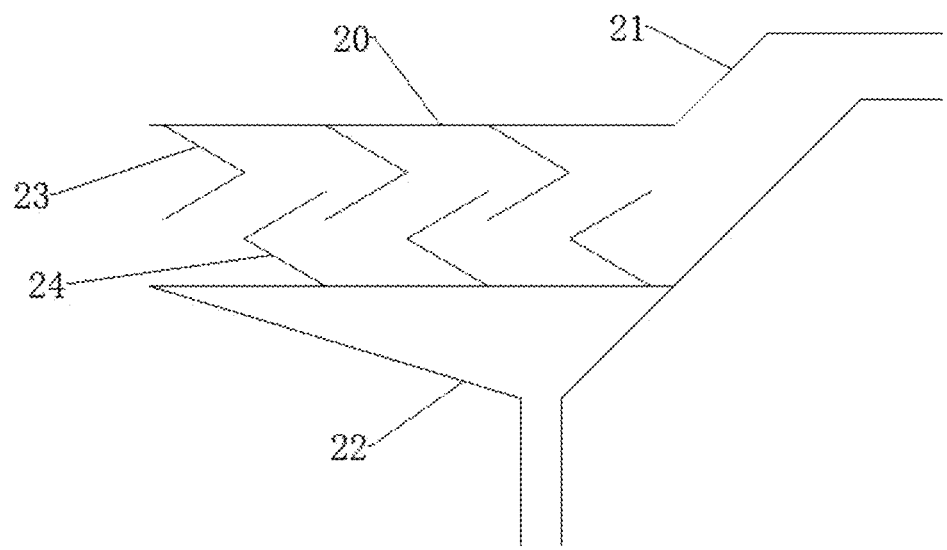
FIG. 2 is a structural view of the steam-liquid separation device of a technical solution.
Figure 3:
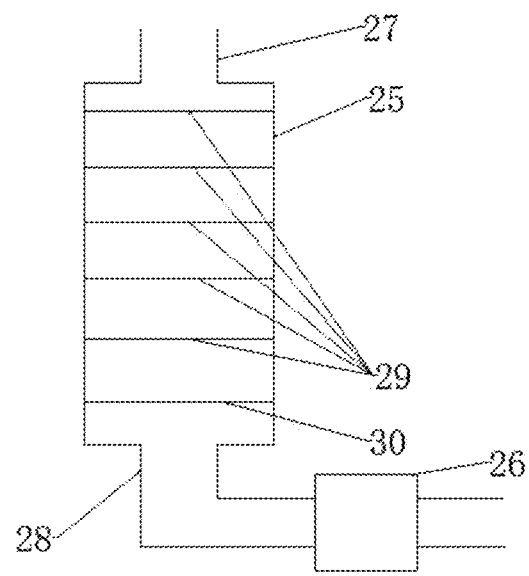
FIG. 3 is a structural view of the solid-liquid separation device of a technical solution.

As shown in FIG. 1 to FIG. 3 of the drawings, the present invention provides a liquefaction device of hard bone, comprising:

an outer cavity 1, the upper end of which is detachably sealed with an upper cover 2, and the lower end is openable/closable sealed with a lower sealing cover 3, and the upper cover 2 having a feeding port 4 and a first steam inlet port 5; the upper cover 2, the outer cavity 1 and the lower sealing cover 3 capable of forming a closed space to provide conditions for the first-stage liquefaction.

a first liquefaction cavity 6, which is coaxially and slidably up and down disposed in the outer cavity 1, and a sidewall of the first liquefaction cavity 6 being provided with a pressure relief port; the first liquefaction cavity 6 being the first-stage liquefaction place, and the pressure relief port being used for instantaneously discharging the pressure in the first liquefaction cavity 6;

a stainless steel cage 7 disposed coaxially in the first liquefaction cavity 6, and a top surface of the stainless steel cage 7 being detachably connected to a bottom surface of the upper cover 2, and the top surface of the stainless steel cage 7 being located below the feeding port 4 and having a feeding inlet; the stainless steel cage 7 being used to carry hard bones, and perform solid-liquid separation of the liquefied product.

a second liquefaction cavity 8 having a top surface fixed to an outer sidewall of the outer cavity 1 such that a lower end portion of the outer cavity 1 is located in the second liquefaction cavity 8. The second liquefaction cavity 8 being the second-stage liquefaction place.

In this technical solution, in use, the hard bones are first put into the stainless steel cage 7, and then the upper cover 2 and the lower sealing cover 3 are sealed with the outer cavity 1. Steam is introduced from the first steam inlet port 5 for performing the first-stage liquefaction. When the first liquefaction time is reached, the lower sealing cover 3 is opened, and the first liquefaction cavity 6 instantaneously slides down the outer cavity 1 into the second liquefaction cavity 8 under the action of the high pressure. The hard bones are performed chemical bond rupture, mechanical tearing, and structural rearrangement under the large differential pressure of an internal high pressure and an external low pressure, so that the soluble components in the hard bone are liquefied, the structure of the insoluble component becomes loose, and the soluble components enter the second liquefaction cavity 8. The insoluble components remain in the stainless steel cage 7, and then the steam is introduced into the second liquefaction cavity 8, performing second-stage liquefaction. When the second-stage liquefaction time is reached, the second liquefaction cavity 8 is instantaneously opened for pressure relief, and the second-stage liquefaction is completed. Finally, the stainless steel cage 7 is taken out. The insoluble components (bone residue) are collected, and the soluble components (liquid product which is mainly collagen polypeptide) in the second liquefaction cavity 8 are collected. The whole operation is completed. The technical solution can be used for the first-stage and second-stage liquefaction of the hard bones, which can fully liquefy the soluble components in the hard bone, and greatly improve the treatment effect of the hard bone. While the stainless steel cage 7 can achieve solid-liquid separation. The insoluble components remain in the stainless steel cage 7, and the soluble components enter the second liquefaction cavity 8. The solid-liquid separation of the product can be completed at the same time of liquefaction, thereby greatly improving the processing efficiency of the hard bone, simplifying the process flow, and reducing the production cost.

In another technical solution, the horizontal spacing between the stainless steel cage 7 and the first liquefaction cavity 6 is 3 to 5 cm. A plurality of through circular hole with a pore diameter of 1 to 2 cm is uniformly formed on the side wall and the bottom surface of the stainless steel cage 7. The volume of the two liquefaction cavity 8 is 10 to 50 times that of the first liquefaction cavity 6. The horizontal spacing of 3-5 cm can make the best effect of the first-stage liquefaction. When the pore diameter is set to 1-2 cm, the first-stage liquefaction effect is best when the insoluble components are basically kept in the stainless steel cage 7. The first liquefaction cavity 6 is only subjected to first-stage liquefaction. And after the second liquefaction cavity 8 is subjected to second-stage liquefaction, steam-liquid separation and solid-liquid separation are also required, and thus the volume of volume of the two liquefaction cavity 8 is 10 to 50 times that of the first liquefaction cavity 6 for better achieving respective functions.

In another technical solution, a second steam inlet port 9 is opened on the top surface of the second liquefaction cavity 8. A discharge port 10 is opened on the bottom surface of the second liquefaction cavity 8. A steam outlet port 11 is opened on the sidewall of the second liquefaction cavity 8, and the steam outlet port 11 is covered with an openable/closable steam outlet cover 12. The second steam inlet port 9 is used for introducing steam required for second-stage liquefaction. The discharge port 10 is for discharging the soluble components (liquid products) after liquefaction. The steam outlet port 11 and the steam outlet cover 12 are used together to realize instantaneous pressure relief of the second liquefaction cavity 8.

In another technical solution, the feeding port 4 is coaxially disposed with the outer cavity 1, and the feeding port 4 is openable/closable provided with a sealing cover. The center of the top surface of the sealing cover is fixed with a lifting lug 13 for opening the sealing cover. The lower sealing cover 3 is elliptical shape bulged upward. A vacuum tube 14 is fixed to a sidewall of the second liquefaction cavity 8, and the vacuum tube 14 is in communication with the second liquefaction cavity 8. The second liquefaction cavity 8 can be pumped to a negative pressure by the vacuum tube 14, so that the first liquefaction cavity 6 forms a larger pressure difference with the second liquefaction cavity 8 when the pressure of the first liquefaction cavity 6 is released, thereby enhancing the liquefaction effect.

The liquefaction device of hard bone also comprises:

a pair of first cylinder brackets 15 horizontally and symmetrically fixed on the outer side wall of the outer cavity 1;

a pair of first open cover cylinders 16 respectively correspondingly fixed to the pair of first cylinder brackets 15, piston rods of the pair of first open cover cylinders 16 extending into the second liquefaction cavity 8 and each of the lower end portion horizontally fixing with a crossbeam, and the crossbeam being fixed to the lower sealing cover 3 by two vertical supporting rods. The pair of first open cover cylinders 16 are used to open or close the lower sealing cover 3 to achieve sealing pressure holding process and a pressure relief process in the first-stage liquefaction.

a pair of second cylinder brackets 17 vertically and symmetrically fixed on the upper and lower sides of the steam outlet port 11;

a pair of second open cover cylinders 18 respectively correspondingly fixed to the pair of second cylinder brackets 17, a vertical beam being fixedly connected between piston rods of the pair of second open cover cylinders 18, and the vertical beam being fixed to the steam outlet cover 12 by two horizontal supporting rods. The pair of second open cover cylinders 18 are used to open or close the steam outlet cover 12 to achieve sealing pressure holding process and a pressure relief process in the second-stage liquefaction.

Wherein the piston rods of the pair of first open cover cylinders 16 are shortened such that the lower sealing cover 3 abuts against the lower end portion of the outer cavity 1 and the first liquefaction cavity 6, and the piston rods of the pair of first open cover cylinders 16 extending such that the lower sealing cover 3 separates from the lower end portion of the outer cavity 1, the piston rods of the pair of second open cover cylinders 18 shortening to close the steam outlet cover 12, and the piston rods of the pair of second open cover cylinders 18 extending to open the steam outlet cover 12.

In another technical solution, a pair of sliders 19 are symmetrically disposed on the outer sidewall of the first liquefaction cavity 6, and a pair of sliding rails adapted to the pair of sliders 19 are arranged on the inner wall of the outer cavity 1 so that the first liquefaction cavity 6 slides up and down relative to the outer cavity 1, a sealing member being fixed on the bottom surface of the upper cover 2, and the upper end portion of the first liquefaction cavity 6 and the sealing member tightly abutting against when the piston rods of the pair of first open cover cylinders 16 are shortened to seal a gap between the upper end portion of the first liquefaction cavity 6 and the upper end portion of the outer cavity 1. Using this technical solution, the pair of sliders 19 and the pair of sliding rails are used in combination to realize sliding up and down of the first liquefaction cavity 6 in the outer cavity 1. The shape of the sealing member is the same as the shape of the upper end portion of the first liquefaction cavity 6. It may be square or annular. When the sealing member abuts against the upper end portion of the first liquefaction cavity 6, it is possible to prevent steam and liquid products from entering the gap between the upper end portion of the first liquefaction cavity 6 and the upper end portion of the outer cavity 1.

In another technical solution, the liquefaction device of hard bone also comprises:

a steam-liquid separation device provided in the second liquefaction cavity, the steam-liquid separation device comprising a separation pipe 20, a steam outlet pipe 21 and a liquid collecting pipe 22, the separation pipe 20 being a horizontal square pipe, the separation pipe 20 being opening far from one end of the steam outlet port 11, the bottom surface of the separation pipe 20 being uniformly provided with a plurality of liquid outlets, and the separation pipe 20 being provided with a plurality of V-shaped liquid separation plates with an angle of 60 degrees, and the plurality of liquid separation plates including a plurality of upper liquid separation plates 23 and a plurality of lower liquid separation plates 24 with equal number, one end of the plurality of upper liquid separation plates 23 being fixed on the top surface of the separation pipe 20 at a 1-shape equal interval along the length direction of the separation pipe 20, and one end of the plurality of lower liquid separation plates 24 being fixed on the bottom surface of the separation pipe 20 at a 1-shape equal interval along the length direction of the separation pipe 20, and a lower liquid separation plate 23 being arranged between the two adjacent upper liquid separation plates 24, previous upper liquid separation plate 23 and the apex of the adjacent next lower liquid separation plate 24 being located in the same vertical line along the direction of fluid flow, and each liquid separation plate being provided with a plurality of run-through circular holes, the diameter of a plurality of circular holes on a plurality of upper liquid separation plates 23 and the diameter of a plurality of circular holes on a plurality of lower liquid separation plates 24 increasing sequentially along the direction of fluid flow, the steam outlet pipe 21 comprising an inclined pipe section inclined upward at 45 degrees, a straight pipe section communicated with the inclined pipe section and horizontally arranged, and the lower end of the inclined pipe section being communicated with one end of the separation pipe 20 close to the steam outlet port 11, the straight pipe section being communicated with the steam outlet port 11, the liquid collecting pipe 22 being a vertical funnel shape, the upper end of the liquid collecting pipe 22 being communicated with the bottom of the separation pipe 20, and the bottom of the liquid collecting pipe 22 being slightly higher than the bottom of the second liquefaction cavity 8; the steam-liquid separation device capable of effectively intercepting the liquid product brought out by the steam during the pressure relief in the second-stage liquefaction, thereby improving the yield of the product, wherein the separation pipe 20 is provided with a plurality of V-shaped liquid separation plates, and the liquid separation plates are intermittently intersected. The liquid separation plates are disposed on the top surface and the bottom surface of the separation pipe 20. The structure can increase separation area of steam and liquid, thereby effectively intercepting the liquid product brought out in the steam, and at the same time it will not significantly prolong the time of pressure relief. Thus, the effect of second-stage liquefaction will not be reduced while ensuring steam-liquid separation.

a solid-liquid separation device comprising a filter tube 25 communicating with the discharge port 10, and a liquid pumping pump 26 communicated to the filter tube 25, the filter tube 25 being a vertically disposed circular tube, the upper end surface of the filter tube 25 being provided a liquid inlet 27 and the lower end surface being provided with a liquid outlet 28, the liquid inlet 27 being communicated to the discharge port 10, and the liquid outlet 28 being communicated with the liquid pumping pump 26, and multi-layer stainless steel mesh 29 and a filter cloth 30 with a 200-gauge diameter being fixed at equal intervals from the top to the bottom of the filter tube. The solid-liquid separation device can effectively remove fine bone chips mixed in the liquid product to facilitate subsequent treatment of the liquid product.

Embodiment 1

A method for co-production of bone collagen polypeptide and ultrafine bone powder based on the liquefaction device of hard bone, the method including the steps of: selecting hard bones of the edible animal and crushing to a particle size of 3 cm; feeding the crushed hard bone into the stainless steel cage, closing the lower sealing cover to seal the outer cavity, and introducing saturated steam with a pressure of 1.5 MPa into the first steam inlet port, performing first-stage liquefaction. The first-stage liquefaction time is 10 min. The pressure of the second liquefaction cavity is drawn to a negative pressure of −0.08 MPa, and then opening the lower sealing cover for the first pressure relief, after completing the first pressure relief, introducing saturated steam with a pressure of 1.0 MPa into the second steam inlet port, performing second-stage liquefaction. And the second-stage liquefaction time is 5-10 min, and finally performing the second pressure relief to obtain liquid phase and solid phase; centrifuging the liquid phase at a rotational speed of 14000 rpm to obtain a bone collagen polypeptide solution, and then concentrating the bone collagen polypeptide solution to a concentration of 40 degrees Brix to obtain a concentrated solution, finally performing spray-drying of the concentrated solution at 140 degree Celsius to obtain the bone collagen polypeptide; drying the solid phase at a temperature of 60 degree Celsius to a water content of 5%, and then placing the dried solid phase in a high-speed universal pulverizer for coarse pulverization to obtain ultrafine bone powder with a particle size of 100 micrometer, finally, placing the ultrafine bone powder in a planetary ball mill, and milling 3 h at a speed of 350 r/min and a milling ball diameter of 1 cm to obtain the ultrafine bone powder with a particle size of less than 15 micrometer.

Embodiment 2

A method for co-production of bone collagen polypeptide and ultrafine bone powder based on the liquefaction device of hard bone, the method including the steps of: selecting hard bones of the edible animal and crushing to a particle size of 4 cm; feeding the crushed hard bone into the stainless steel cage, closing the lower sealing cover to seal the outer cavity, and introducing saturated steam with a pressure of 1.8 MPa into the first steam inlet port, performing first-stage liquefaction. The first-stage liquefaction time is 15 min. The pressure of the second liquefaction cavity is drawn to a negative pressure of −0.08 MPa, and then opening the lower sealing cover for the first pressure relief, after completing the first pressure relief, introducing saturated steam with a pressure of 1.5 MPa into the second steam inlet port, performing second-stage liquefaction. And the second-stage liquefaction time is 8 min, and finally performing the second pressure relief to obtain liquid phase and solid phase; centrifuging the liquid phase at a rotational speed of 15000 rpm to obtain a bone collagen polypeptide solution, and then concentrating the bone collagen polypeptide solution to a concentration of 48 degrees Brix to obtain a concentrated solution, finally performing spray-drying of the concentrated solution at 160 degree Celsius to obtain the bone collagen polypeptide; drying the solid phase at a temperature of 70 degree Celsius to a water content of 6%, and then placing the dried solid phase in a high-speed universal pulverizer for coarse pulverization to obtain ultrafine bone powder with a particle size of 200 micrometer, finally, placing the ultrafine bone powder in a planetary ball mill, and milling 3.5 h at a speed of 400 r/min and a milling ball diameter of 1 cm to obtain the ultrafine bone powder with a particle size of less than 15 micrometer.

Embodiment 3

A method for co-production of bone collagen polypeptide and ultrafine bone powder based on the liquefaction device of hard bone, the method including the steps of: selecting hard bones of the edible animal and crushing to a particle size of 5 cm; feeding the crushed hard bone into the stainless steel cage, closing the lower sealing cover to seal the outer cavity, and introducing saturated steam with a pressure of 2.3 MPa into the first steam inlet port, performing first-stage liquefaction. The first-stage liquefaction time is 20 min. The pressure of the second liquefaction cavity is drawn to a negative pressure of −0.09 MPa, and then opening the lower sealing cover for the first pressure relief, after completing the first pressure relief, introducing saturated steam with a pressure of 2.0 MPa into the second steam inlet port, performing second-stage liquefaction. And the second-stage liquefaction time is 10 min, and finally performing the second pressure relief to obtain liquid phase and solid phase; centrifuging the liquid phase at a rotational speed of 16000 rpm to obtain a bone collagen polypeptide solution, and then concentrating the bone collagen polypeptide solution to a concentration of 55 degrees Brix to obtain a concentrated solution, finally performing spray-drying of the concentrated solution at 180 degree Celsius to obtain the bone collagen polypeptide; drying the solid phase at a temperature of 80 degree Celsius to a water content of 8%, and then placing the dried solid phase in a high-speed universal pulverizer for coarse pulverization to obtain ultrafine bone powder with a particle size of 250 micrometer, finally, placing the ultrafine bone powder in a planetary ball mill, and milling 4 h at a speed of 450 r/min and a milling ball diameter of 2 cm to obtain the ultrafine bone powder with a particle size of less than 15 micrometer.

In order to illustrate the effects of the present invention, the inventors provide comparative experiments as follows:

Comparative Example 1

A method for co-production of bone collagen polypeptide and ultrafine bone powder using existing processing method of hard bone, the method including the steps of: adding water to the hard bone, and then cooking at high temperature, after finishing cooking, filtering, the drying filtered solid, performing coarse grinding, and performing superfine grinding to obtain a finished product of ultrafine bone powder, and centrifuging filtered liquid, concentrating, and drying to obtain bone collagen polypeptide.

The fat, protein and calcium contents (percentages) of the ultrafine bone powder prepared in embodiments 1 to 3 and comparative example 1 were measured, and the particle size distribution, Fourier infrared spectrum and surface structure of the ultrafine bone powder prepared in embodiment 1 was measured. The surface structures of the femoral body and femoral head before and after liquefaction of the raw material hard bone in embodiment 1 were measured.

Figure 4:
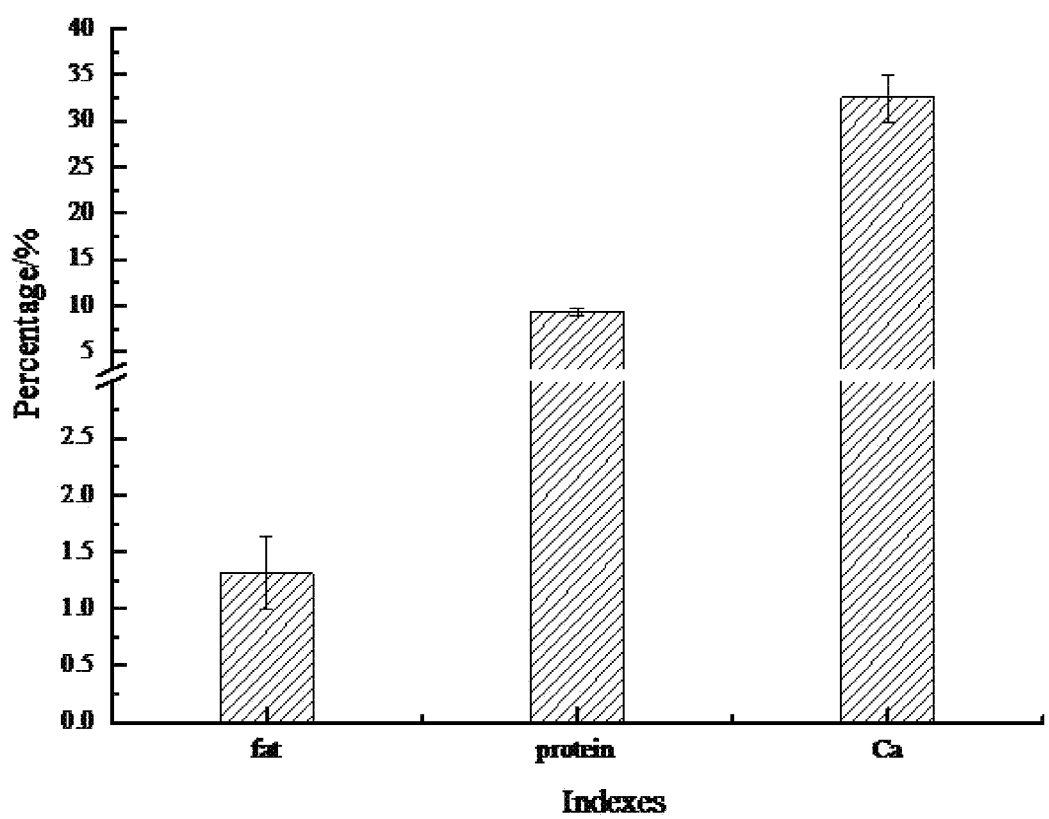
FIG. 4 is a graph showing the contents of fat, protein and calcium in the ultrafine bone powder prepared in embodiment 1 of the present invention.
Figure 5:
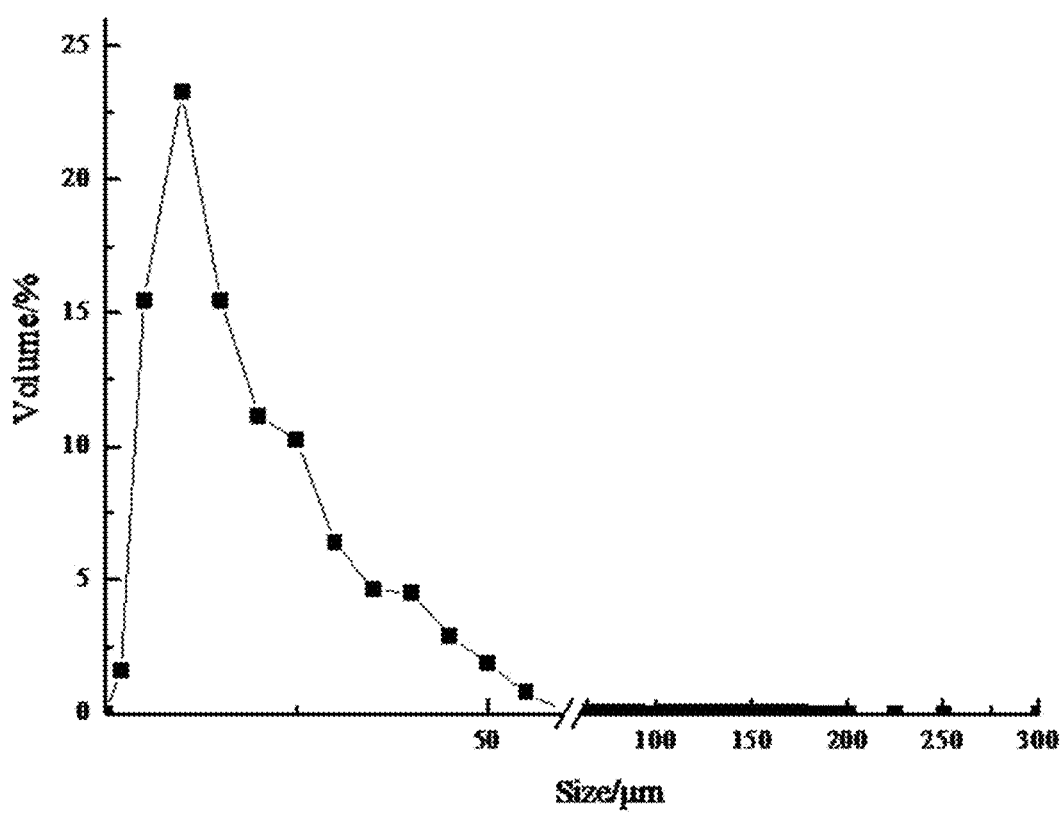
FIG. 5 is a diagram showing the particle size distribution of the ultrafine bone powder prepared in embodiment 1 of the present invention.
Figure 6:
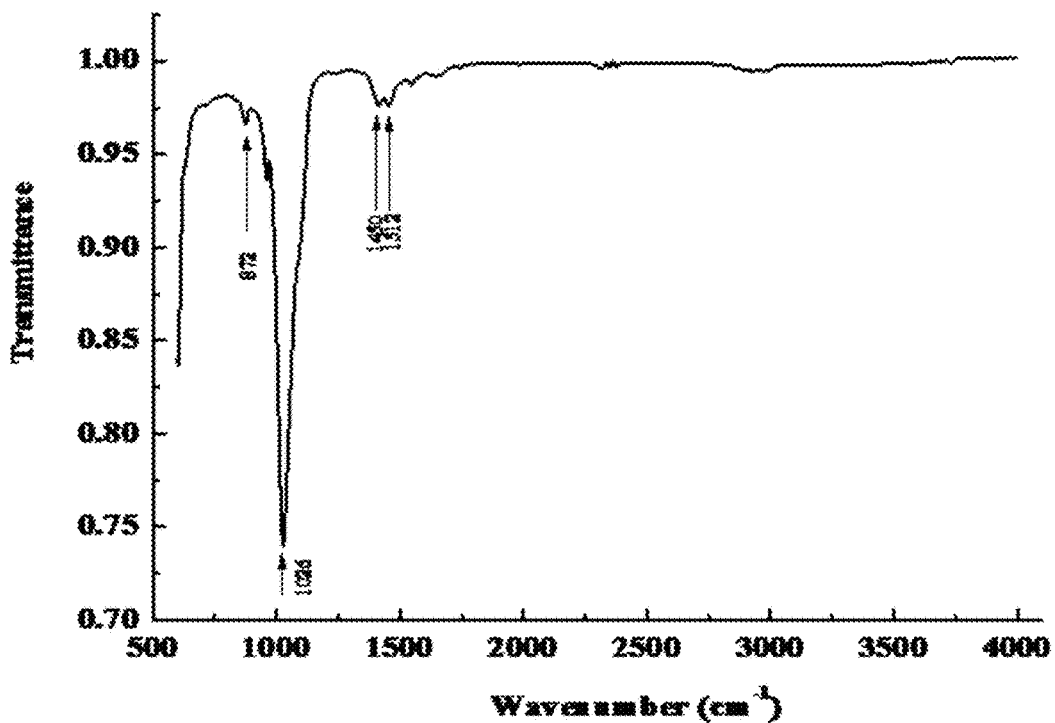
FIG. 6 is a Fourier infrared spectrum of the ultrafine bone powder prepared in embodiment 1 of the present invention.
Figure 7:
FIG. 7 is a scanning electron micrograph of the ultrafine bone powder prepared in embodiment 1 of the present invention.
Figure 8:
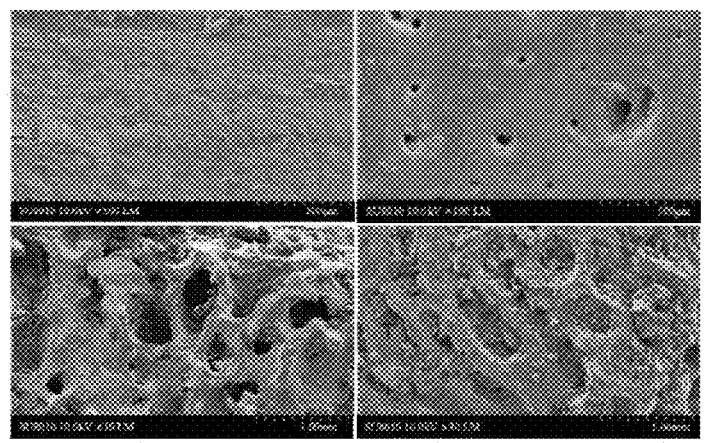
FIG. 8 is a scanning electron micrograph of the femoral body and femoral head before and after liquefaction of the raw material hard bone in embodiment 1 of the present invention.

It was determined that the effects of embodiments 1 to 3 were superior to comparative example 1. The specific effects of embodiment 1 are compared with comparative example 1. The fat, protein and calcium contents of the ultrafine bone powder prepared in embodiment 1 and comparative example 1 are shown in Table 1. The fat, protein and calcium contents of the ultrafine bone powder prepared in embodiment 1 are shown in FIG. 4. The particle size distribution is shown in FIG. 5. The Fourier infrared spectrum is shown in FIG. 6. The results of scanning electron microscopy are shown in FIG. 7 (the picture on the left is 200 times and the picture on the right is 500 times). The scanning electron micrographs of the femoral body and femoral head before and after liquefaction of the raw material hard bone in embodiment 1 are shown in FIG. 8 (the upper left picture is the scanning electron micrograph of the femoral body before liquefaction, the upper right picture is the scanning electron micrograph of the femoral body after liquefaction, the lower left picture is the scanning electron micrograph of the femoral head before liquefaction, and the lower right picture is the scanning electron micrograph of the femoral head after liquefaction).

TABLE 1

| Group | Fat contents(%) | Protein contents(%) | calcium contents(%) |
|---|---|---|---|
| Embodiment 1 | 1.31 ± 0.32 | 9.33 ± 0.43 | 32.53 ± 2.57 |
| Comparative example 1 | 8.22 ± 0.34 | 15.41 ± 0.28 | 26.07 ± 0.35 |

Comparing the comparative example 1 with the embodiment 1, the comparative example 1 is a method for co-production of bone collagen polypeptide and ultrafine bone powder by a conventional high-temperature cooking method. As can be seen from the above Table 1, the fat contents and protein contents of the ultrafine bone powder prepared in the comparative example 1 are significantly higher than that of the embodiment 1, and the calcium contents are lower than that of the embodiment 1, which shows that soluble fat and protein contents of ultrafine bone powder obtained by the comparative example 1 are too high, and the content of insoluble calcium is decreased. It indicates that the liquefaction treatment method used in embodiment 1 can better make the soluble components dissolve from the hard bone than the conventional high temperature cooking method, thereby reducing the content of soluble components in the ultrafine bone powder, and improving the purity of the ultrafine bone powder and the extraction rate of the soluble components.

It can be seen from FIG. 5 that the median diameter of the ultrafine bone powder prepared in the embodiment 1 is (13.51±0.29) micrometer, and 90% of particles are distributed within 40 micrometer, which indicates that the particle size of the ultrafine bone powder is small and distribution width is narrow after liquefaction treatment. This is because structure of the hard bones is destroyed after high-temperature and high-pressure liquefaction, and becomes more porous and porous, which is very favorable for subsequent ultrafine pulverization.

It can be seen from FIG. 6 that the ultrafine bone powder is mainly composed of phosphate and carbonate, and contains a small amount of organic matter.

It can be seen from FIG. 7 that the ultrafine bone powder prepared in the embodiment 1 by the liquefaction treatment has a small particle size and a uniform distribution, and most of them have an elliptical shape, a relatively regular shape, and no large irregular particles.

It can be seen from FIG. 8 that the pores on the femoral body are significantly increased, and the femoral head is broken to some extent in ultrafine bone powder prepared in the embodiment 1 by the liquefaction treatment. Because fats distributed on the bone structure is dissolved on the one hand so that the original structure such as gaps and pores is prominently prominent. On the other hand, the hydrogen bonds in the collagen molecule are cut off by high temperature hydrolysis to disintegrate triple helix structure, and further destroy the combination with minerals. And high pressure treatment may promote the process production and extent. Therefore, of the hard bone, the extraction rate of soluble components of the hard bones after liquefaction treatment can be greatly improved. At the same time, it is beneficial to pulverization of solid bone slag in the later stage, and the ultrafine bone powder with fine particle size and uniformity is obtained.

Although the embodiments of the present invention have been disclosed above, they are not limited to the applications previously mentioned in the specification and embodiments, and can be applied in various fields suitable for the present invention. For ordinary skilled person in the field, other various changed model, formula and parameter may be easily achieved without creative work according to instruction of the present invention, changed, modified and replaced embodiments without departing the general concept defined by the claims and their equivalent are still included in the present invention. The present invention is not limited to particular details and illustrations shown and described herein.

What is claimed is:

1. A liquefaction device of bone comprising:
an outer cavity, an upper end of which is detachably sealed with an upper cover, and a lower end of which is openable/closable sealed with a lower sealing cover, the upper cover having a feeding port and a first steam inlet port;
a first liquefaction cavity which is coaxially and slidably up and down disposed in the outer cavity, and a sidewall of the first liquefaction cavity being provided with a pressure relief port;
a stainless steel cage disposed coaxially in the first liquefaction cavity, and a top surface of the stainless steel cage being detachably connected to a bottom surface of the upper cover, and the top surface of the stainless steel cage being located below the feeding port and having a feeding inlet;
a second liquefaction cavity having a top surface fixed to an outer sidewall of the outer cavity such that a lower end portion of the outer cavity is located in the second liquefaction cavity.

2. The liquefaction device of bone according to claim 1, being characterized in that, a horizontal spacing between the stainless steel cage and the first liquefaction cavity is 3 to 5 cm, and a plurality of through circular hole with a hole diameter of 1 to 2 cm being uniformly formed on a side wall and a bottom surface of the stainless steel cage, a volume of the second liquefaction cavity being 10 to 50 times that of a volume of the first liquefaction cavity.

3. The liquefaction device of bone according to claim 1, being characterized in that, a second steam inlet port is opened on a top surface of the second liquefaction cavity, a discharge port being opened on a bottom surface of the second liquefaction cavity, a steam outlet port being opened on a sidewall of the second liquefaction cavity, and the steam outlet port being covered with an openable/closable steam outlet cover.

4. The liquefaction device of bone according to claim 3, being characterized in that, the feeding port is coaxially disposed with the outer cavity, and the feeding port, is openable/closable provided with a sealing cover, the center of the top surface of the sealing cover being fixed with a lifting lug, and the lower sealing cover being elliptical shape bulged upward, a vacuum tube being fixed to a sidewall of the second liquefaction cavity, and the vacuum tube being in communication with the second liquefaction cavity;
also comprising:
a pair of first cylinder brackets horizontally and symmetrically fixed on the outer side wall of the outer cavity;
a pair of first, open cover cylinders respectively correspondingly fixed to the pair of first cylinder brackets, piston rods of the pair of first open cover cylinders extending into the second liquefaction cavity and a lower end portion of each piston rod horizontally fixing with a crossbeam, and the crossbeam being fixed to the lower sealing cover by two vertical supporting rods;
a pair of second cylinder brackets vertically and symmetrically fixed on upper and lower sides of the steam outlet port;
a pair of second open cover cylinders respectively correspondingly fixed to the pair of second cylinder brackets, a vertical beam being fixedly connected between piston rods of the pair of second open cover cylinders, and the vertical beam being fixed to the steam outlet cover by two horizontal supporting rods;
wherein the piston rods of the pair of first open cover cylinders are shortened such that the lower sealing cover abuts against the lower end portion of the outer cavity and the first liquefaction cavity, and the piston rods of the pair of first open cover cylinders extending such that the lower sealing cover separates from the lower end portion of the outer cavity, the piston rods of the pair of second open cover cylinders shortening to close the steam outlet cover, and the piston rods of the pair of second open cover cylinders extending to open the steam outlet cover.

5. The liquefaction device of bone according to claim 4, being characterized in thy pair of sliders are symmetrically disposed on an outer sidewall of the first liquefaction cavity, and a pair of sliding rails adapted to the pair of sliders being arranged on an inner wall of the outer cavity so that the first liquefaction cavity slides up and down relative to the outer cavity, a sealing member being fixed on the bottom surface of the upper cover, and an upper end portion of the first liquefaction cavity and the sealing member abutting against each other when the piston rods of the pair of first open cover cylinders are shortened to seal a gap between the upper end portion of the first liquefaction cavity and the upper end portion of the outer cavity.

6. The liquefaction device of bone according to claim 3, comprising:
- a steam-liquid separation device provided in the second liquefaction cavity, the steam-liquid separation device comprising a separation pipe, a steam outlet pipe and a liquid collecting pipe, the separation pipe being a horizontal square pipe, the separation pipe comprising an opening away from one end of the steam outlet port, the bottom surface of the separation pipe being uniformly provided with a plurality of liquid outlets, and the separation pipe being provided with a plurality of V-shaped liquid separation plates with an angle of 60 degrees, and the plurality of liquid separation plates including a plurality of upper liquid separation plates and a plurality of lower liquid separation plates with equal number, one end of the plurality of upper liquid separation plates being fixed on the top surface of the separation pipe at a l-shape equal interval along the length direction of the separation pipe, and one end of the plurality of lower liquid separation plates being fixed on the bottom surface of the separation pipe a l-shape equal interval along the length direction of the separation pipe, and a lower liquid separation plate being arranged between the two adjacent upper liquid separation plates, a previous upper liquid separation plate and an apex of an adjacent next lower liquid separation plate being located in the same vertical line along the direction of fluid flow, and each liquid separation plate being provided with a plurality of run-through circular holes, the diameter of a plurality of circular holes on a plurality of upper liquid separation plates and the diameter of a plurality of circular holes on a plurality of lower liquid separation plates increasing sequentially along the direction of fluid flow, the steam outlet pipe comprising an inclined pipe section inclined upward at 45 degrees, a straight pipe section communicated with the inclined pipe section and horizontally arranged, and the lower end of the inclined pipe section being communicated with one end of the separation pipe close to the steam outlet port, the straight pipe section being communicated with the steam outlet port, the liquid collecting pipe being a vertical funnel shape, an upper end of the liquid collecting pipe being communicated with the bottom of the separation pipe, and a bottom of the liquid collecting pipe being higher than the bottom of the second liquefaction cavity;
- a solid-liquid separation device comprising a filter tube communicating with the discharge port, and a liquid pumping pump communicated to the filter tube, the filter tube being a vertically disposed circular tube, the upper end surface of the filter tube being provided a liquid inlet and the lower end surface being provided with a liquid outlet, the liquid inlet being communicated to the discharge port, and the liquid outlet being communicated with the liquid pumping pump, and multi-layer stainless steel mesh and a filter cloth with a 200-gauge diameter being fixed at equal intervals from the top to the bottom of the filter tube.

7. The liquefaction device of bone according to claim 1, being characterized in that, the liquefaction device is used for producing bone collagen polypeptide and ultrafine bone powder comprises:
- step one: selecting bones of an edible animal and crushing the bones;
- step two: feeding the crushed bones of the step one into the stainless steel cage, closing the lower sealing cover to seal the outer cavity, and introducing steam with a pressure of 1.5 to 2.3 MPa into the first steam inlet port, performing first-stage liquefaction, the first-stage liquefaction time being 10-20 min, and the pressure of the second liquefaction cavity being drawn to a negative pressure of −0.08 MPa to −0.09 MPa, and then opening the lower sealing cover for a first pressure relief, after completing the first pressure relief, introducing steam with a pressure of 1.0-2.0 MPa into the second steam inlet port, performing second-stage liquefaction, and the second-stage liquefaction time being 5-10 min, and finally performing a second pressure relief to obtain liquid phase and solid phase;
- step three: centrifuging, concentrating and drying the liquid phase obtained in the step two to obtain the bone collagen polypeptide;
- step four: drying, performing pulverizing of the solid phase prepared in the step two to obtain ultrafine bone powder.

8. The liquefaction device of bone according to claim 7, being characterized in that, the liquefaction size of the hard bone after crushing in step one is 3-5 cm.

9. The liquefaction device of bone according to claim 7, being characterized in that, the specific operation of the step three includes: centrifuging the liquid phase at a rotational speed of 14000-16000 rpm to obtain a bone collagen polypeptide solution, and then concentrating the bone collagen polypeptide solution to a concentration of 40-55 degrees Brix to obtain a concentrated solution, finally, performing spray-drying of the concentrated solution at 140-180 degree Celsius to obtain the bone collagen polypeptide.

10. The liquefaction device of bone according to claim 7, being characterized in that, the specific operation of step four includes: drying the solid phase at a temperature of 60-80 degree Celsius to a water content of 5 to 8%, and then placing the dried solid phase in a universal pulverizer for pulverization to obtain ultrafine bone powder with a particle size of 100-250 micrometer, finally, placing the ultrafine bone powder in a planetary ball mill, and milling 3-4 h at a speed of 350-450 renin and a milling ball diameter of 1-2 cm to obtain the ultrafine bone powder with a particle size of less than 15 micrometer.

\* \* \* \* \*